US007633946B2

(12) United States Patent
Pavon et al.

(10) Patent No.: US 7,633,946 B2
(45) Date of Patent: Dec. 15, 2009

(54) SCHEDULER SYSTEM AND METHOD THEREOF

(75) Inventors: Javier del Prado Pavon, Ossining, NY (US); Sai Shankar Nandagopalan, Tarrytown, NY (US); Amjad Soomro, Hopewell Junction, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 475 days.

(21) Appl. No.: 10/532,748

(22) PCT Filed: Oct. 10, 2003

(86) PCT No.: PCT/IB03/04567

§ 371 (c)(1),
(2), (4) Date: Apr. 26, 2005

(87) PCT Pub. No.: WO2004/036838

PCT Pub. Date: Apr. 29, 2004

(65) Prior Publication Data

US 2006/0052088 A1    Mar. 9, 2006

(51) Int. Cl.
*H04L 12/28* (2006.01)
(52) U.S. Cl. .................. 370/395.4; 370/449
(58) Field of Classification Search .............. 370/346, 370/449, 395.4, 343, 344, 230
See application file for complete search history.

(56) References Cited

U.S. PATENT DOCUMENTS

| 7,123,627 | B2 * | 10/2006 | Kowalski | 370/468 |
|---|---|---|---|---|
| 2002/0089994 | A1 * | 7/2002 | Leach et al. | 370/412 |
| 2002/0093929 | A1 * | 7/2002 | Mangold et al. | 370/336 |
| 2003/0063563 | A1 * | 4/2003 | Kowalski | 370/230 |
| 2003/0081547 | A1 * | 5/2003 | Ho | 370/229 |
| 2003/0161340 | A1 * | 8/2003 | Sherman | 370/445 |
| 2004/0081133 | A1 * | 4/2004 | Smavatkul et al. | 370/346 |
| 2004/0114534 | A1 * | 6/2004 | Benveniste | 370/252 |
| 2004/0136396 | A1 * | 7/2004 | Yonge et al. | 370/445 |
| 2004/0151283 | A1 * | 8/2004 | Lazoff | 379/45 |
| 2004/0190467 | A1 * | 9/2004 | Liu et al. | 370/311 |
| 2005/0174973 | A1 * | 8/2005 | Kandala et al. | 370/338 |
| 2006/0171362 | A1 * | 8/2006 | Garg et al. | 370/338 |
| 2007/0263655 | A1 * | 11/2007 | Esteves et al. | 370/460 |
| 2007/0263657 | A1 * | 11/2007 | Sugar et al. | 370/465 |
| 2008/0049761 | A1 * | 2/2008 | Lin et al. | 370/395.21 |

* cited by examiner

*Primary Examiner*—Kwang B Yao
*Assistant Examiner*—Kenan Cehic
(74) *Attorney, Agent, or Firm*—Larry Liberchuk

(57) ABSTRACT

Disclosed is a method and system based on MAC frames for enabling a QAP to seamlessly operate between granting polls for upstream and sidestream traffic while sending downstream frames. The inventive scheduling method uses a minimum set of mandatory TSPEC parameters to generate a schedule, which provides minimum performance requirement in wireless local area networks (WLANs).

15 Claims, 4 Drawing Sheets

SCHEDULER SYSTEM AND METHOD THEREOF

BACKGROUND OF THE INVENTION

1. Field of the Invention

The present invention relates generally to communication systems, and more particularly, the present invention relates to a scheduler and related method for efficiently granting polls to upstream and/or sidestream traffic and sending downstream frames.

2. Description of the Related Art

Scheduling is essential in providing quality of service (QoS) in data networks where multiple users share common resources. This is especially true in the context of wireless links. That is, the time-varying nature of wireless links presents great challenges in the design of scheduling policy in wireless data services because of the scarcity of radio resource and the time-varying nature of radio quality. Currently, most scheduling policies are dependent on the queue length or arrival rate or time stamps present in a transmitted medium access control (MAC) frame and do not consider the channel capacity. This would suffice if the channel capacity to all users were constant as is the case in wire-line systems. However, in the context of wireless networks, a drawback of these schemes is that they always result in an under-utilization of the wireless resources by not accounting for the channel capacity (i.e., the channel condition and continuously varying transmission rate).

Currently, the 802.11 MAC offers a simplified model, referred to as a "best-effort" model. In the simplified scheme, all frames receive the same level of service with no distinction for frames from different applications. In accordance with the model, an attempt is made to forward frames as soon as possible, but makes no quantitative commitments about the quality of service (QoS) provisioning. But with the advent of 802.11e, which is a quality of service MAC, a scheduler is needed to guarantee the QoS requirements for different streams.

Accordingly, there is a need for a scheduling policy that can be incorporated on top of the IEEE 802.11e/D4.0. draft standard enabling an QoS access point (QAP) to take into account the QoS requirements of the stream and schedule appropriately.

SUMMARY OF THE INVENTION

The present invention is directed to a scheduling method for use in a wireless local area network (WLAN) that enables a QAP to seamlessly operate between granting polls for upstream and sidestream traffic while sending downstream frames.

According to an aspect of the invention, there is provided a scheduling method for scheduling the transmission of a data stream in a wireless communications network having at least one access point (QAP) and at least one station (WSTA). The method is achieved by receiving a request to send at least one data stream for transmission from at least one WSTA by the QAP; granting, by the QAP, the request to send the data stream; transmitting, by the WSTA, a MAC frame comprised of a set of parameters defining the characteristics of the data stream; and, calculating, by the QAP, service and transmission times according to a schedule algorithm for servicing at least one WSTA. The schedule algorithm is operative to schedule the transmission of at least one data stream at the calculated service and transmission times, and the parameters of the MAC frame includes: Mean Data Rate ($\rho_i$), Nominal MSDU Size ($L_i$), Maximum Service Interval or Delay Bound ($D_i$), Transmission Rate ($R_i$), Size of Maximum MSDU ($M_i$).

According to another aspect of the invention, a system for scheduling the transmission of a data stream in a wireless communications network, which includes at least one access point (QAP) and at least one station (WSTA). The system includes means for determining, at the QAP, whether at least one data stream is originated from at least one WSTA based on a MAC frame comprised of a set of parameters defining the characteristics of at least one data stream; means for computing service and transmission times, at the QAP, for servicing at least one WSTA in accordance with a schedule algorithm; and, means for transmitting, by the WSTA, at least one data stream at the computed service and transmission times. The means for calculating the service and transmission times further comprises means for determining a Service Interval (SI) and a TXOP duration for said SI, wherein the SI is determined by selecting a number that is lower than the SI and is a submultiple of a beacon interval.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE EMBODIMENTS

In the following description, for purposes of explanation rather than limitation, specific details are set forth such as the particular architecture, interfaces, techniques, etc., in order to provide a thorough understanding of the present invention. For purposes of simplicity and clarity, detailed descriptions of well-known devices, circuits, and methods are omitted so as not to obscure the description of the present invention with unnecessary detail.

The inventive method is a scheduling algorithm that provides minimum performance requirement for upstream, downstream and sidestream scheduling in wireless local area networks (WLANs). The method is intended for implementation by an access point (QAP) in a QBSS network.

Figure 1:
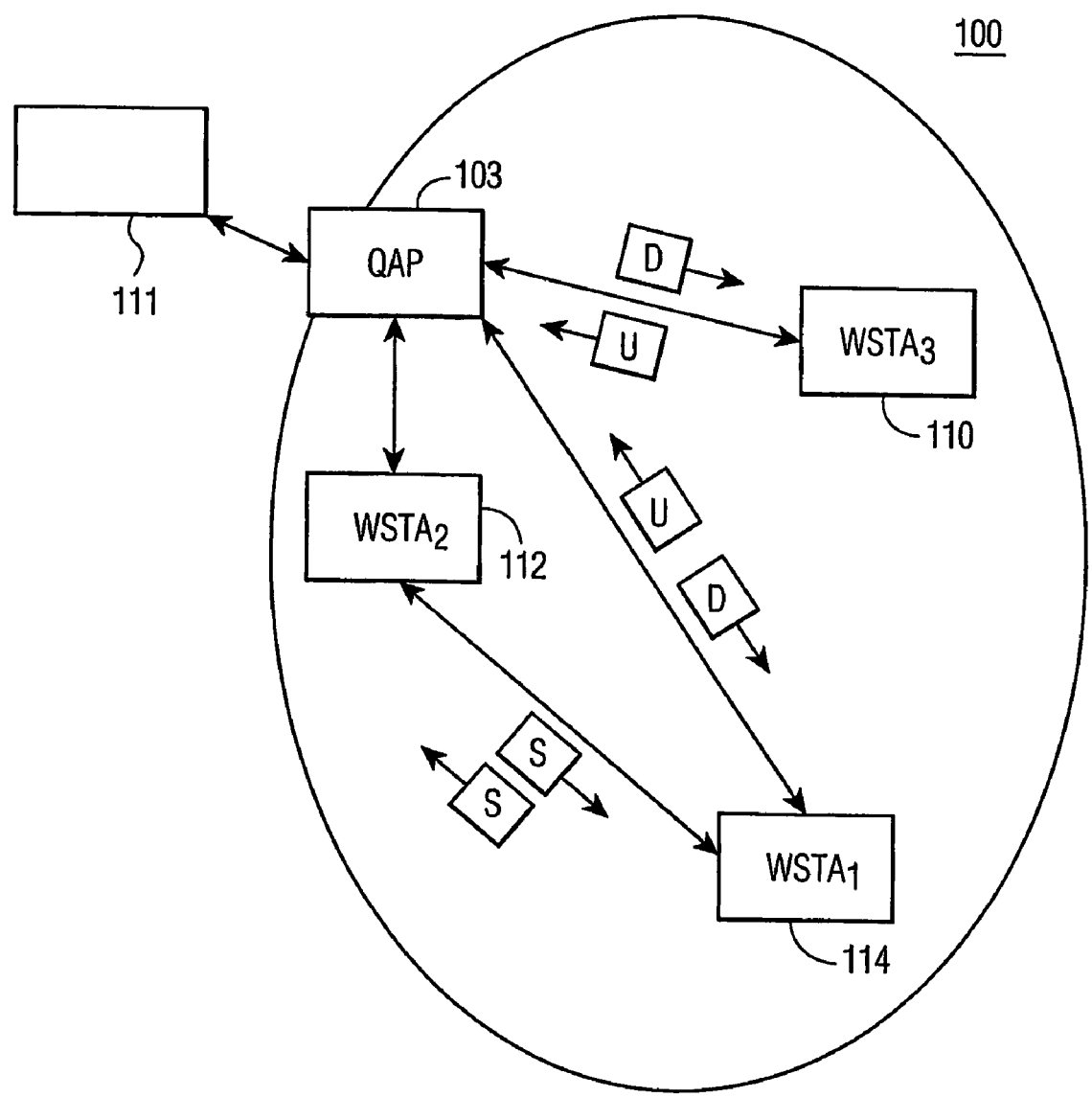
FIG. 1 illustrates the architecture of a wireless communication system whereto embodiments of the present invention are to be applied.

FIG. 1 is an illustration of a representative network 100 whereto embodiments of the present invention may be applied. As shown, FIG. 1 illustrates a QBSS network 100 including an QAP 103 coupled to a stationary network 111 and a plurality of stations (WSTA$_1$ through WSTA$_3$) 110, 112, 114. A primary function of the QAP 103 is to facilitate the transmission of data packets. Data packets include "upstream" packets (i.e., packets transmitted in a direction from the WSTAs 110-114 to the QAP 103), labeled as "U", "downstream" packets (i.e., packets transmitted in a direction from the QAP 103 to the WSTAs 110-114), labeled as "D", and "sidestream" packets (i.e., packets transmitted from one WSTA 110-114 to another WSTA), labeled as "S". Although a limited number of WSTAs is shown in FIG. 1 for illustrative purposes, it is to be understood that the WLAN can support concurrent communications between a much larger number of WSTAs. Thus, the number of WSTAs in the drawing should not impose limitations on the scope of the invention.

Figure 2:
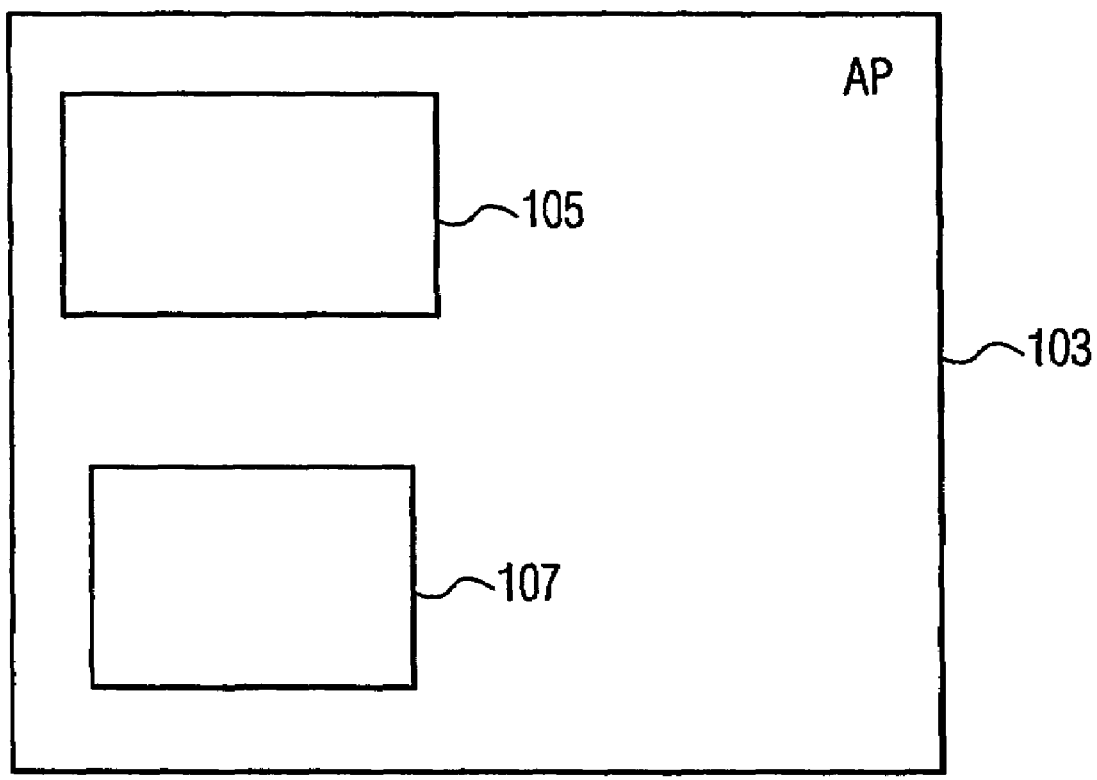
FIG. 2 is a block diagram of a QAP according to an embodiment of the invention.

Referring to FIG. 2, a block diagram of the functional elements of the QAP 103 of FIG. 1 is shown. The QAP 103 includes a scheduler 105 for determining, first the time instants when the QAP 103 is required to serve the WSTAs for upstream sidestream and/or downlink traffic, and second, the servicing times (or TXOP) to serve each WSTA 110-114 desiring to transmit traffic so as to satisfy the WSTA's 110-114 pre-negotiated data rates and other QoS requirements. The QAP 103 further includes an admissions control unit 350 for determining if traffic from a WSTA 110-114 can be admitted in the QBSS and if its QoS requirements can be satisfied depending on the available bandwidth.

The present invention is directed exclusively to the scheduling of parameterized QoS traffic. As defined by the IEEE 802.11 standard, parameterized traffic is identified by priority values in the range 8 to 15 which are included as part of a 16 bit QoS control field in the MAC header of each frame. The priority values 8-15 are interpreted as traffic stream identifiers (TSID). Parameterized traffic could include, for example, video telephone, low cost video conferencing, imaging, High Definition Television (HDTV), streaming audio and/or video and so on. Each of the afore-mentioned applications may place different demands on the wireless communications network 100 depending upon their respective bandwidth requirements. That is, some applications described above are more bit intensive than others (e.g., an HDTV video stream at 24 Mbps). In general, most real time applications qualify as being bit intensive and as such place high demands on the transmission network 100. Other applications, such as stereophonic audio which is typically transmitted at 128 Kbps is comparably less bit intensive and consequently less demanding on the network 100 resources. Therefore, a mechanism is needed to efficiently schedule these disparate network demands for processing by the network 100.

To perform scheduling in an efficient manner at the QAP 103, the scheduler 105 must control two processes: (1) determine the existence of any upstream or sidestream streams that the WSTAs 110-114 intend to transmit (2) determine if there is data required to be sent downstream from the stationary network 111, via the QAP 103, to the WSTAs 110-114. The first process is achieved in a polling operation performed by the scheduler 105 at the QAP 103. In the polling operation, the scheduler 105 determines which WSTAs have traffic streams to be transmitted upstream to the QAP 103 or sidestream to other WSTA 110-114.

Once it is determined by the scheduler 105 that one or more WSTAs 110-114 have traffic streams to be transmitted/received, a negotiation session is conducted between the QAP 103 and the one or more WSTAs 110-114 intending to transmit data upstream or sidestream.

As part of the negotiation session, a permission protocol is invoked by the Admission Control Unit 109 in the QAP 103 to grant permission to the requesting WSTA. Once permission is granted to an WSTA, the negotiation process then proceeds by the requesting WSTA, which has been granted permission, informing the QAP 103 of certain parameters related to the traffic stream to be transmitted, including the data rate and other traffic QoS characteristics. Upon receiving these parameters at the QAP 103, the scheduler 105 associated with the QAP 103 collects the parameter data for each traffic stream (i.e., requesting WSTA) compute in advance a time instance for servicing the various WSTAs requesting to transmit data upstream, downstream or sidestream, in a manner that satisfies a pre-negotiated data rate and other QoS requirements.

Now, a detailed description of the embodiment of the present invention relating to operation steps of the scheduler is described hereinafter.

In operation, each WSTA send a MAC frame (or Traffic Specification (TSPEC) frame), which contains information needed by QAP for proper operation of the QoS facility. The format of the TSPEC frame as set forth in IEEE 802.11e is defined in FIG. 3. As shown, the TSPEC contains the set of parameters that define the characteristics and QoS expectation of a traffic stream for use by the QAP and non-QAP WSTAs in support of parameterized QoS traffic transfer. A key feature of the scheduling method of the invention is that the inventive simplified scheduling method uses a minimum set of mandatory TSPEC parameters to generate a schedule.

Figure 3:
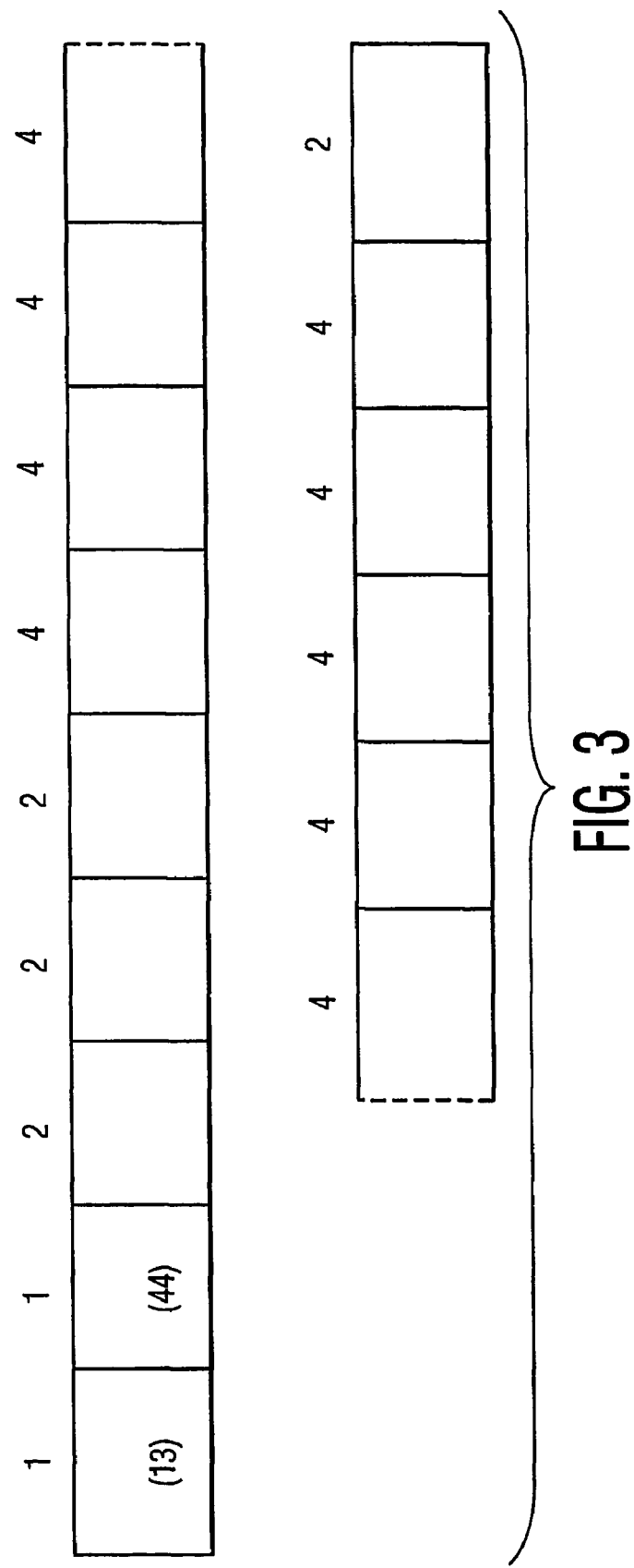
FIG. 3 illustrates a format of the Traffic Specification (TSPEC) elements containing a set of parameters that define the characteristics and QoS expectations of a traffic stream.

Referring to FIG. 3, the scheduler 105 uses a mandatory set of TSPEC parameters as set forth under this invention to generate a TXOP duration and service interval: (1) Mean Data Rate ($\rho$), (2) Nominal MSDU Size (L), and (3) Maximum Service Interval or Delay Bound (D). The scheduler 105 also uses other parameters available to generate a TXOP duration and service interval: (i) Minimum PHY Rate (R), (ii) MSDU of Maximum Size, M=2304bytes, and (iii) Overheads In Time units (O). In the preferred embodiment, the schedule for a stream is calculated in two steps. The first step is the calculation of the Scheduled Service Interval (SI). In the second step, the TXOP duration for a given SI is calculated for the stream.

It is noted that the basic unit of allocation of the right to transmit onto the WSTA is the TXOP. Each TXOP is defined by an implicit starting time (relative to the end of a preceding frame) and a defined maximum length. Thus, TXOP is the complete time spent for transmission from one station or the polling times to poll each WSTA 110-114 desiring to transmit data stream.

Admission Control Process

First the QAP needs to decide if the stream for a particular WSTA can be admitted for transmission. In this regard, the number of frames (N) that arrive during Maximum Service Interval or Delay (D) is calculated as follows:

$$N_i = D_i \rho_i / L_i$$

Then, $TXOP_i$ allocated to this stream in D is calculated as follows:

$TXOP_i = N_i L_i / R_i + O$, where O represents the overheads in time units.

Using the above data, it is determined whether a particular stream is admitted. A stream is admitted if it satisfies the following equation, otherwise rejected by QAP:

$$TXOP_{i+1}/D_{i+1} + \sum_{i=1}^{k} TXOP_i/D_i \leq 1,$$

Where i+1 stands for the newly arriving stream and the summation index counts for the streams already admitted and undergoing service from the QAP.

If the stream is admitted, then the scheduler 105 proceeds to the calculation of SI and TXOP duration as follows:

Calculation of Service Interval (SI)

The calculation of the Scheduled Service Interval is done as follows. First the scheduler calculates the minimum of all Maximum Service Intervals (or Delay Bounds) for all admitted streams. Here, this minimum be "m". Second, the scheduler chooses a number lower than "m" that it is a submultiple of the beacon interval. This value will be the Scheduled Service Interval for all WSTAs with admitted streams.

For example, if three streams with maximum service intervals=60, 65, and 70 ms, an the beacon interval is 100 ms, then choose a Service Interval (SI)=50 ms.

Calculation of TXOP Duration

For the calculation of the TXOP duration for an admitted stream, the scheduler 105 uses the following parameters: Mean Data Rate ($\rho$) and Nominal MSDU Size (L) from the negotiated TSPEC, the Scheduled Service Interval (SI) calculated above, Physical Transmission Rate (R), Size of Maximum MSDU, i.e., 2304 bytes (M) and Overheads in time units (O). Note that the Physical Transmission Rate can be the Minimum PHY Rate negotiated in the TSPEC. If Minimum PHY Rate is not committed in AddTS response frame, the scheduler can use observed PHY rate as R. It is assumed in the embodiment that the Overheads in time include interframe spaces, ACKs and CF-Polls. For simplicity, details for the overhead calculations are omitted in this example.

Now, the TXOP duration is calculated as follows. First the scheduler calculates the number of MSDUs that arrived at the Mean Data Rate during the SI. This number is N:

$$N_i = \left\lceil \frac{SI \times \rho_i}{L_i} \right\rceil$$

Then the scheduler calculates the TXOP duration as the maximum of (1) time to transmit Ni frames at Ri and (2) time to transmit one maximum size MSDU at Ri (plus overheads):

$$TXOP_i = \max\left(\frac{N_i \times L_i}{R_i} + O, \frac{M}{R_i} + O\right)$$

Figure 4:
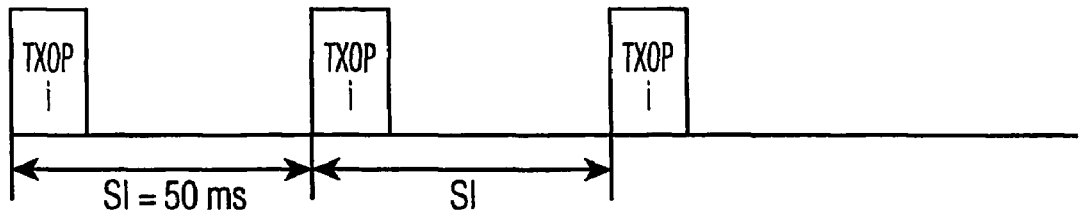
FIGS. 4-6 illustrate a timing diagram to explain the polling procedure according to an embodiment of the invention.

An example is shown in FIG. 4. Stream from QSTA "i" is admitted. The beacon interval is 100 ms and the Maximum Service Interval for the stream is 60 ms. The scheduler calculates a Scheduled Service Interval (SI) equal to 50 ms using the steps explained above.

Figure 5:
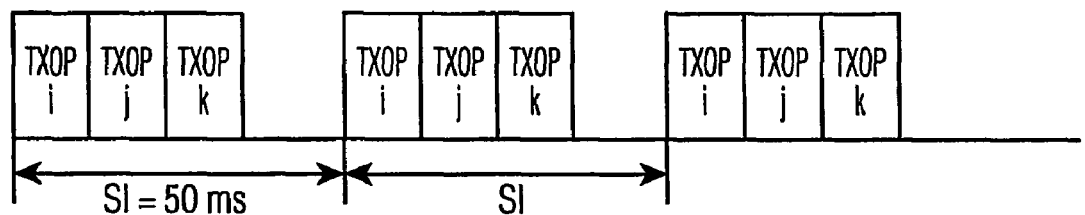

The same process is repeated continuously while the Maximum Service Interval for the admitted stream is smaller than current SI. An example is shown in FIG. 5.

If a new stream is admitted with a Maximum Service Interval smaller than the current SI, the scheduler needs to change the current SI to a smaller number than the Maximum Service Interval of the newly admitted stream. Therefore the TXOP duration for the current admitted streams needs also to be recalculated with the new SI.

Figure 6:
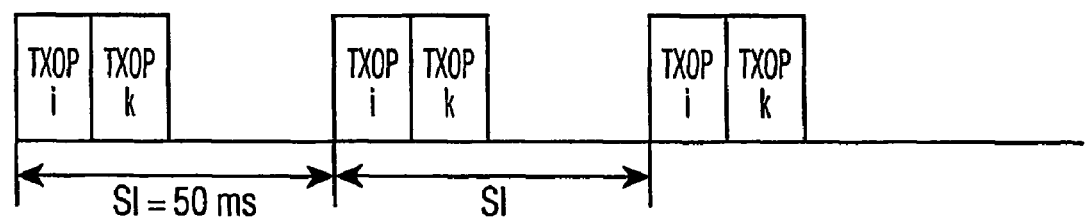

If a stream is dropped, the scheduler may use the time available to resume contention. The scheduler may also choose to move the TXOPs for the QSTAs following the QSTA dropped to use the unused time. An example is shown in FIG. 6 when stream for QSTA j is removed. However, this last option may require the announcement of a new schedule to all QSTAs.

Having thus described a preferred embodiment of a method for generating a scheduler with a minimum set of TSPEC parameters in a WLAN, it should be apparent to those skilled in the art that certain advantages of the system have been achieved. The foregoing is to be constructed as only being an illustrative embodiment of this invention. Persons skilled in the art can easily conceive of alternative arrangements providing a functionality similar to this embodiment without any deviation from the fundamental principles or the scope of this invention.

The invention claimed is:

1. A method for scheduling a transmission of at least one data stream in a wireless communications network having at least one access point and at least one station, the method comprising:
    receiving by the at least one access point a request to send said at least one data stream for transmission from the at least one station;
    granting by the at least one access point said request to send said at least one data stream;
    transmitting by the at least one station a medium access control (MAC) frame comprised of a set of parameters defining the characteristics of said at least one data stream; and
    calculating by the access point service and transmission times according to a schedule algorithm utilizing said parameters, wherein calculating the service and transmission times includes determining a Service Interval (SI) and a servicing time (TXOP) for said at least one data stream by: calculating a minimum interval of all Maximum Service Intervals for said at least one data stream, and calculating the SI by choosing a number that is lower than said calculated minimum interval and is a submultiple of a beacon interval.

2. The method of claim 1, wherein said schedule algorithm is operative to schedule the transmission of said at least one data stream at said calculated service and transmission times.

3. The method of claim 1, further comprising generating polling frames or downlink frames at said calculated service and transmission times for transmission of said at least one data stream.

4. The method of claim 1, wherein said at least one data stream is parameterized traffic stream.

5. The method of claim 1, wherein the parameters of said MAC frame include Mean Data Rate ($\rho_i$), Nominal MSDU Size ($L_i$), and Maximum Service Interval or Delay Bound ($D_i$).

6. The method of claim 1, wherein the determining said TXOP uses additional parameters: Transmission Rate ($R_i$), Size of Maximum MSDU ($M_i$), and Overheads in Time units ($O_i$).

7. A method for scheduling the transmission of a data stream in a wireless communications network having at least one access point (QAP) and at least one station (WSTA), the method comprising:
    determining, at said QAP, whether at least one data stream is originated from said at least one WSTA based on a MAC frame comprised of a set of parameters defining the characteristics of said at least data stream;
    computing service and transmission times, at said QAP, for servicing said at least one WSTA in accordance with a schedule algorithm utilizing said parameters, wherein computing the service and transmission times includes determining a Service Interval (SI) and a servicing time (TXOP) for said at least one data stream by calculating a minimum interval of all Maximum Service Intervals, and calculating the SI by choosing a number that is lower than said minimum interval and is a submultiple of a beacon interval; and
    transmitting, by said at least one WSTA, said at least one data stream at said computed service and transmission times.

8. The method of claim 7, wherein said at least one data stream is parameterized traffic stream.

9. The method of claim 7, wherein the parameters of said MAC frame include Mean Data Rate ($\rho_i$), Nominal MSDU Size ($L_i$), and Maximum Service Interval or Delay Bound ($D_i$).

10. The method of claim 7, wherein the determining said TXOP uses additional parameters: Transmission Rate ($R_i$), Size of Maximum MSDU ($M_i$), and Overheads in Time units ($O_i$).

11. A system for seamlessly granting polls for upstream and/or sidestream traffic while simultaneously sending downstream traffic from an access point (QAP) to at least one station (WSTA), the system comprising:

a memory for storing a computer-readable code; and a processor operatively coupled to said memory, said processor being configured to:

(1) receive by said QAP a request to send at least one data stream for transmission from the at least one WSTA;

(2) grant by said QAP said request to send said at least one data stream from said WSTA;

(3) transmit, by said at least one WSTA, a MAC frame comprised of a set of parameters defining the characteristics of said at least one data stream; and (4) calculate, by said QAP, service and transmission times according to a schedule algorithm for servicing said at least one WSTA utilizing said parameters, wherein said processor calculates the service and transmission times by determining a Service Interval (SI) and a servicing time (TXOP) for said at least one data stream by calculating a minimum interval of all Maximum Service Intervals for said at least one data stream, and calculating the SI by choosing a number that is lower than said calculated minimum interval and is a submultiple of a beacon interval.

12. The system of claim 11, wherein the parameters of said MAC frame includes: Mean Data Rate ($\rho_i$), Nominal MSDU Size ($L_i$), and Maximum Service Interval or Delay Bound ($D_i$).

13. A system for scheduling the transmission of a data stream in a wireless communications network having at least one access point (QAP) and at least one station (WSTA), the system comprising:

means for determining, at said QAP, whether at least one data stream is originated from said at least one WSTA based on a MAC frame comprised of a set of parameters defining the characteristics of said at least one data stream;

means for calculating service and transmission times, at said QAP, for servicing said at least one WSTA in accordance with a schedule algorithm utilizing said parameters, wherein the means for calculating the service and transmission times further comprises means for determining a Service Interval (SI) and a servicing time (TXOP) for said at least one data stream by calculating a minimum interval of all Maximum Service Intervals for said at least one data stream, and calculating the SI by choosing a number that is lower than said calculated minimum interval and is a submultiple of a beacon interval; and means for transmitting, by said at least one WSTA, said at least one data stream at said computed service and transmission times.

14. The system of claim 13, wherein the parameters of said MAC frame include Mean Data Rate ($\rho_i$), Nominal MSDU Size ($L_i$), and Maximum Service Interval or Delay Bound ($D_i$).

15. The system of claim 13, wherein the means for determining uses additional parameters: Transmission Rate ($R_i$), Size of Maximum MSDU ($M_i$), and Overheads in Time units ($O_i$).

* * * * *